C. D. Read.
Harvester Rake.
N° 39497  Patented Aug 11, 1863.
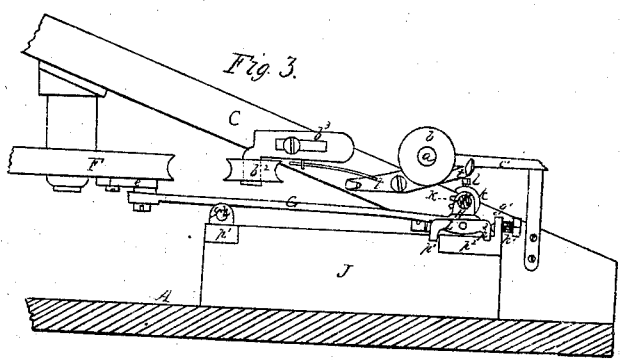
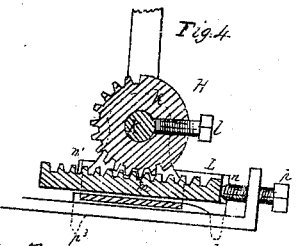
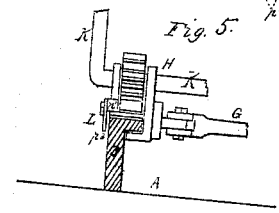
Witnesses
R. T. Campbell
Edw. P. Brown
Inventor
C. D. Read
Munn & Lawrence his atty

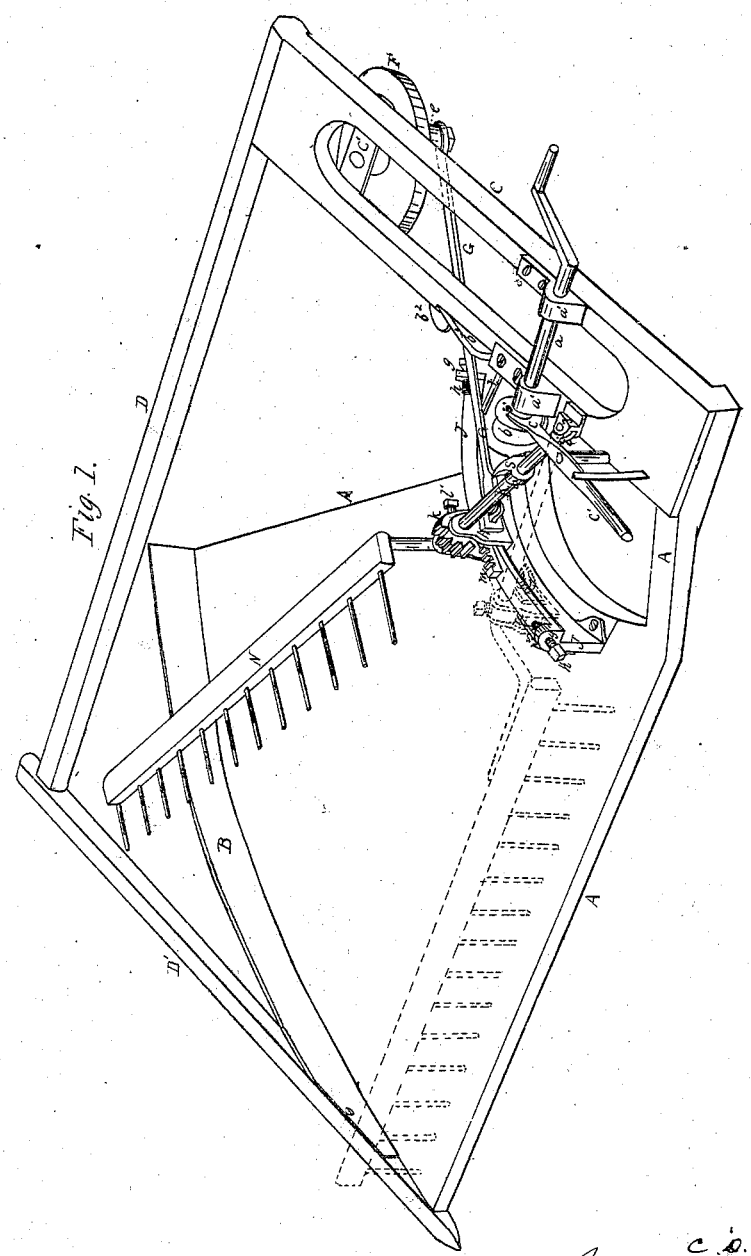

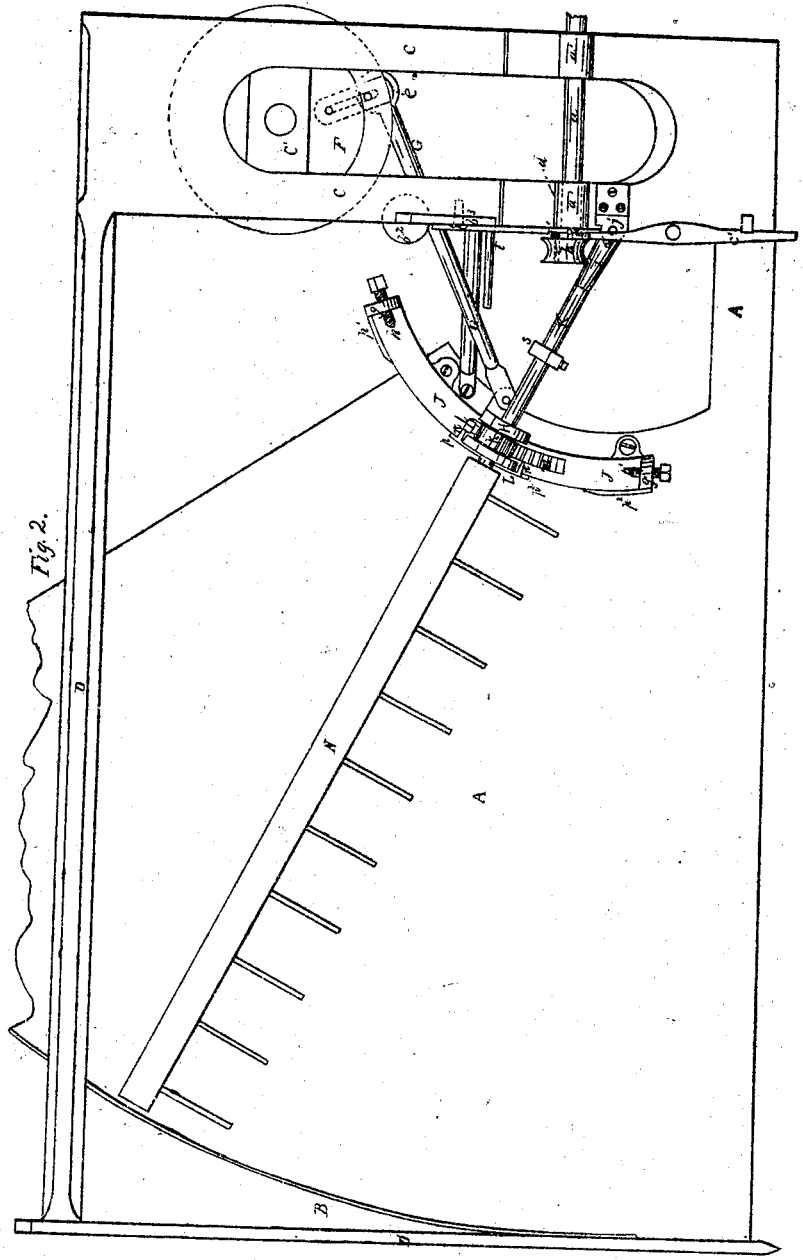

UNITED STATES PATENT OFFICE.

C. D. READ, OF HAMILTON, OHIO.

IMPROVEMENT IN RAKES FOR HARVESTERS.

Specification forming part of Letters Patent No. 39,497, dated August 11, 1863.

*To all whom it may concern:*

Be it known that I, C. D. READ, of Hamilton, in the county of Butler and State of Ohio, have invented certain new and useful Improvements in Rakes for Harvesters; and I do hereby declare that the following is a full, clear, and exact description thereof, reference being had to the accompanying drawings, making a part of this specification, in which—

Figure 1 is a perspective view, showing my improvements applied to the platform and frame-work of a harvesting-machine. Fig. 2 is a plan view of Fig. 1, representing the rake in the middle of the platform in its forward stroke. Fig. 3 is a longitudinal section through the platform, showing an elevation of the inclined frame and also the mechanism for supporting, guiding, and giving motion to the rake. Fig. 4 is a longitudinal section through the segment pinion and rack and the slideway upon which they are supported. Fig. 5 is a transverse section through the segmental slideway, showing the rack and pinion and the manner in which they are applied thereto.

Similar letters of reference indicate corresponding parts in the several figures.

This invention relates to certain new and useful improvements in machinery for operating that class of rakes for reaping and mowing machines which vibrate about a fixed center in a horizontal plane, or in a plane parallel with the platform upon which the grass or grain is spread.

The nature of my invention consists in combining with a rake which is moved in a horizontal plane about a fixed center a sliding rack and the segment of a pinion spur-wheel, which are arranged within a bearing-box and supported upon a segmental slideway in such a manner that at the terminus of the forward stroke of the rake its tines will be brought down in a perpendicular position to the platform, and thus held during its backward stroke, and at the terminus of its backward stroke the tines will be thrown up and confined in a position parallel to the platform, so as to clear the cut grain thereon in the return-stroke of the rake, all as will be hereinafter described.

It also consists in regulating the length of stroke of the rake by means of adjustable set-screws arranged at the extremities of the segmental slide-rest, in combination with an adjustable connecting-rod and crank-wheel, arranged and operating as will be hereinafter described.

It also consists in combining with the main driving-pulley, which communicates motion to the rake, a system of levers and a cam which is keyed to the vibrating rake-shaft, so arranged that the rake can be stopped by the driver only when it is at the rear end of the platform and out of the way of the cut grain thereon.

It finally consists in a novel means for locking the rake-shaft both when it is elevated and when it is depressed, as will be hereinafter described.

To enable others skilled in the art to make and use my invention, I will proceed to describe its construction and operation.

In the accompanying drawings, A represents the platform of the machine, which is of the form of a segment of a circle.

B represents a curved fender, applied to the outer edge of the platform for preventing the cut product from falling off at this point; and C is an inclined frame, which is connected at its front end to a projecting arm, A', of the platform A, and at its rear or upper end to a horizontal transverse bar, D. This bar D is framed into the upper end of the inclined dividing-beam D', which is secured at its forward end to the side of the platform, as shown in Figs. 1 and 2 of the drawings. This forms the frame-work for supporting and containing the rake and the machinery for operating it.

The driving-shaft $a$ is supported in bearing-blocks $a$ $a'$, which are affixed to the inclined frame C, and this shaft carries on its end next to the platform a grooved pulley, $b$, which has a grooved hub, $b'$, on one side to receive the yoke $c$ on the end of horizontal lever $c'$, Figs. 1 and 2. Two slots or notches, opposite each other, are made in the sides of the hub $b'$, on pulley $b$, to receive a pin, $d$, which is passed diametrically through the shaft $a$, and when this pin $d$ is in the notches the pulley $b$ is moved with its shaft $a$; but when the forward arm of lever $c'$ is moved so as to slide the pulley outward, and thus release it from the pin $d$, it will not rotate with its shaft. A band (not shown in the drawings) passes over pulley $b$, around pulley $b^2$, and also around the large crank-wheel F, and by this means the motion of driving-shaft $a$ communicates motion to the horizontal crank-wheel F. The pulley $b^2$, which is interposed between pulleys $b$ and F, is on the end of an adjustable slotted plate, $b^3$, which is attached to the side of frame C by means of an adjusting set-screw. (Shown in Fig. 3.) By means of this plate $b^3$ the belt, running over pulley $b^2$, may be tightened at pleasure.

The vertical shaft of the crank-wheel F is connected to and suspended beneath the transverse plate C', and beneath this crank-wheel is a slotted arm, $e$, (shown in dotted lines, Fig. 2,) which being secured to the wheel F by a set-screw, it can be adjusted radially and set at any desired point. To the outer end of this adjustable arm $e$ a pitman-rod, G, is pivoted, the other end of which is pivoted to an ear which projects from one side of a sliding box, H, as shown in Figs. 1 and 2. This sliding box consists of two upright plates, a transverse base-plate, and a grooved extension of the inner plate of the two upright ones, and the whole is mounted upon a segmental slide-rest, J, which is concentric with the axis of motion of the rake, as will be hereinafter described. This slide-rest has a flange projecting from the "inside" of its upper edge, which is received by the groove in the projection of the side plate, as shown clearly in Fig. 5, and in this way the box H is held down on the slide-rest, but allowed to be moved from end to end thereof.

At the extreme ends of the slide-rest J are two ears, $g$ $g'$, furnished with set-screws $h$ $h$, projecting inward, and used for the purpose of regulating the stroke of the rake and also for raising and depressing the rake.

The crank-shaft K of the rake is supported at its inner end in a vibrating thimble-bearing, $i$, which is pivoted at $j$ to the inclined frame C, and at its outer end in the two upright plates of the box H, between which plates a wheel, $k$, having teeth on one portion of its circumference, is secured to the shaft K by means of a set-screw, $l$. This segment of a toothed wheel engages with a short rack, $m$, (shown in Fig. 4,) which is allowed to slide back and forth between the side plates of the box H when it is not confined by the teeth of a spring-plate, L. This sliding movement is imparted to the rack $m$ by means of the set-screws $h$ $h'$ when this rack is brought in contact with one or the other of these screws.

The rake-head N is secured to the crank-arm of the shaft K, and projects out in a line parallel with this shaft and in a plane parallel with the plane of the platform A, so that the rake, rake-shaft, and platform are in planes parallel with each other.

The segmental slide-rest is secured to the platform A in such a relation with its front edge that the rake will be brought up in its forward stroke in a line parallel with the front edge of the platform, receive, and rake off all the cut product at each backward stroke.

The operation of the machine is as follows: Motion being communicated to the horizontal wheel F from the pulley $b$, this wheel, by means of its connecting-rod G, transmits a vibrating motion to the rake N through the medium of the box H, which is now moved from one end of the slide-rest J to the other. When the rake is drawn back toward the rear end of the platform A the projection $p$ on the spring L strikes the inclined projection $p'$ on the slide-rest J, (shown in Figs. 2 and 3,) which throws this end of the spring outward and releases the rack $m$ from the tooth $n$ on this spring. The rack being now released, its rear end strikes the set-screw $h$, which arrests its further movement backward. The motion of the wheel F in completing this stroke of the rake moves the sliding box, together with the toothed segment $k$, which causes this segment to raise the rake, by giving its shaft a quarter-turn, to the position shown in Figs. 1 and 2 in black lines, in which position the rake is locked by the tooth $n'$ on the opposite arm of spring L catching into a notch in the side of rack $m$. The rake now makes its forward stroke toward the forward end of the platform, before the completion of which the opposite end of rack $m$ strikes the set-screw $h'$, (it having been released from the tooth $n'$ by the inclined projection $p^2$ striking the projection $p^3$ on spring L,) and being thus arrested, the pinion-segment $k$ depresses the rake and causes it to assume the position shown in Fig. 1 in red lines—viz., with its teeth perpendicular to the platform A—and being locked in this position by the tooth $n$, as before described, the rake is ready to sweep the cut product off the platform and deposit it in a gavel at the side of the platform.

The oscillating crank-shaft K carries a cam or toe, $s$, situated between the thimble-bearing $i$ and the sliding box H, which is intended to release the spring-lever $c'$ by raising the arm of a spring stop-lever, $t$, Fig. 3, and thus allowing the lever $c'$ to be moved and the pulley $b$ to be disengaged from its clutch, which operation stops the motion of the rake and leaves the rake at the rear end of the platform. The machine may now be drawn about from place to place, and as long as the lever $c'$ is held by the driver in a position which keeps the pulley $b$ disengaged from its driving-shaft $a$ the rake will remain inactive.

When the slotted crank-arm on the crank-wheel F is adjusted for the purpose of increasing or diminishing the stroke of the rake it will be necessary to adjust the set-screws $h$ $h'$ so that they will act upon the rack $m$ at the proper times for raising or depressing the teeth. The set-screws $h$ $h'$ are therefore very important in this connection for adjusting and timing the machinery.

In practice the toothed rack $m$ will be made an arc of a circle concentric with the axis of motion of the rake, as shown in the drawings. When made in this way it will work much easier than if it were made straight.

Having thus described my invention, what I claim as new, and desire to secure by Letters Patent of the United States, is—

1. The combination of a reciprocating rack, $m$, with a toothed segment, $k$, oscillating rake-shaft K, slide-rest J, and arresting-screws $h\ h'$, substantially as described.

2. The combination of adjustable crank-arm $e$, pitman G, and adjustable arresting-screws $h\ h'$, substantially as described.

3. The toothed spring L, in combination with the reciprocating rack $m$ and inclined projections $p'\ p^2$ on the slide-rest J, operating substantially as described.

4. The combination of cam $s$ on rake-shaft K, lever $t$, lever $c'$, and pulley $b$ with a clutching device applied to the driving-shaft $a$, all arranged and operating substantially as described.

5. Releasing the lever $c'$ by means of a cam, $s$, applied to the rake-shaft substantially as described, so that the rake can only be stopped while the machine is moving forward at the terminus of its backward stroke.

6. The combination of the reciprocating rack $m$, toothed segment $k$, oscillating rake-shaft K, and slide-rest J, arranged and operating substantially as described.

C. D. READ.

Witnesses:
D. D. EVANS,
ISRAEL WILLIAMS.